(12) United States Patent
Ofek et al.

(10) Patent No.: US 12,346,575 B2
(45) Date of Patent: Jul. 1, 2025

(54) DATA REPLICATION AND RECOVERY USING JOURNALED SNAPSHOT REPLICATED

(71) Applicant: HUAWEI TECHNOLOGIES CO., LTD., Guangdong (CN)

(72) Inventors: Itamar Ofek, Hod Hasharon (IL); Igor Shafran, Hod Hasharon (IL); Daniel Goodman, Hod Hasharon (IL); Eddy Duer, Hod Hasharon (IL); Michael Hirsch, Hod Hasharon (IL); Assaf Natanzon, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/517,406

(22) Filed: Nov. 22, 2023

(65) Prior Publication Data
US 2024/0086082 A1    Mar. 14, 2024

Related U.S. Application Data

(63) Continuation of application No. PCT/EP2021/064282, filed on May 27, 2021.

(51) Int. Cl.
*G06F 3/06* (2006.01)
(52) U.S. Cl.
CPC ............ *G06F 3/0619* (2013.01); *G06F 3/065* (2013.01); *G06F 3/067* (2013.01)
(58) Field of Classification Search
CPC ......... G06F 3/0619; G06F 3/065; G06F 3/067

USPC ................................................... 711/150, 161
See application file for complete search history.

(56) References Cited

U.S. PATENT DOCUMENTS

| | | | | |
|---|---|---|---|---|
| 7,617,370 | B2 * | 11/2009 | Jernigan, IV | G06F 3/067 709/219 |
| 7,698,334 | B2 * | 4/2010 | Kazar | G06F 3/0611 707/821 |
| 2008/0027998 | A1 * | 1/2008 | Hara | G06F 16/183 |
| 2018/0260125 | A1 * | 9/2018 | Botes | G06F 11/2094 |

\* cited by examiner

*Primary Examiner* — Than Nguyen
(74) *Attorney, Agent, or Firm* — WOMBLE BOND DICKINSON (US) LLP

(57) ABSTRACT

A memory controller is configured to be operatively connected to clients for shared memory access. The memory controller is configured to perform a recovery of a shared memory by determining starting point for the recovery and then replicating shared memory to target file system. The memory controller is configured to determine starting point by: generate journal of file operations, generate a snapshot of the shared memory; restore shared memory as per the snapshot to the target file system; determine last operation before snapshot in journal; and set next operation after last operation as starting point. The memory controller is further configured to replicate shared memory by replaying file operations according to journal starting with starting point. The present disclosure enables to create an initial consistent synchronization point of the shared memory with clients, which in turn ensures reliable data recovery of the shared memory in any adverse event.

19 Claims, 6 Drawing Sheets

DATA REPLICATION AND RECOVERY USING JOURNALED SNAPSHOT REPLICATED

CROSS REFERENCE

This application is a continuation of International Application No. PCT/EP2021/064282, filed on May 27, 2021, which is hereby incorporated by reference in their entireties.

TECHNICAL FIELD

The present disclosure relates generally to the field of shared storages and backup; and more specifically, to a memory controller which is operatively connected to clients for shared memory access and a method for use in the memory controller for shared memory access.

BACKGROUND

Shared storages, such as network-attached storages (NAS), are widely used for storing data from multiple clients. NAS devices are known to provide faster data access, easier administration, and simple configuration, as compared to general-purpose servers also serving files. The network-attached storages store data received from the clients in a source site and thus are also referred to as a source network-attached storage. This data is further stored as a backup data at a target site in a target network-attached storage. Typically, data backup is used to protect and recover data in an event of data loss in the source site. Examples of the event of data loss may include, but is not limited to, data corruption, hardware or software failure in the source site, accidental deletion of data, hacking, or malicious attack. Thus, for safety reasons, a separate backup storage or the target network-attached storage is extensively used to store a backup of the data present in the source site.

The source NAS is constantly used by clients for storing new or updated data. Thus, such incremental changes need to be continuously stored from the source NAS to the target NAS to enable disaster recovery. To enable recovery based on replicating incremental changes from the source NAS to the target NAS, an initial synchronization must first be performed to bring the target NAS to a known state that is identical to a state of the source NAS at start of some sequence of replication of incremental changes. In case of shared storage, and NAS in particular, the synchronization problem is particularly acute since the source NAS is updated simultaneously by multiple clients. Typically, a backup of a snapshot of the source NAS may be restored to the target NAS, but then the source NAS has already changed because the clients are still storing or updating data. Thus, updating incremental changes is difficult, and may lead to data loss in case of a disaster. Conventional techniques store data in the target NAS based on changed files. In an example, this may be based on periodically scanning the entire source NAS or may involve using facilities on the client's side to watch for the changed files. Further, fully changed files are then copied from the source NAS to the target NAS. However, this introduces race conditions as there may be inputs/outputs associated with such files which are continuously taking place even when the files are copied to the target NAS, and thus such incremental changes are not stored with the aforesaid files. Further, as fully changed files must be copied, the process becomes very resource intensive and time consuming. Moreover, such conventional storing of data from the source NAS to the target NAS also involves a vendor lock-in issue and thus, there is a requirement that the source NAS and the target NAS and its tools and replication solutions should belong to a same NAS family. As a result, it becomes increasingly difficult to provide any improvement solution on replication and data recovery when there is a dependency on having compatible source NAS and a target (e.g., a cloud storage). Further, users are required or bound to use specific vendor-provided services to avoid incompatibility issues, which are usually provided for an extra fee, which is again not desirable.

Therefore, in light of the foregoing discussion, there exists a need to overcome the aforementioned drawbacks associated with initial synchronization between source NAS and the target NAS in conventional data storage.

SUMMARY

The present disclosure seeks to provide a memory controller and a method for use in the memory controller for shared memory access. The present disclosure seeks to provide a solution to the existing problem of a high risk of data loss in case of disaster recovery in conventional systems that are associated with replicating of incremental changes in data from the source NAS to the target storage (i.e., an unreliable data recovery mechanism). Moreover, in existing systems, there is a dependency to use compatible vendor services at source and target side, and a user is bound or forced to employ hardware and software solutions in both the source and target shared storage systems from same manufacturer or vendor, which increases the difficulty to solve this problem of unreliable data recovery mechanism. An aim of the present disclosure is to provide a solution that overcomes at least partially the problems encountered in prior art, and provide improved memory controller and method that provides reliable data recovery solution associated with replicating of incremental changes in data from the shared memory (e.g. a source NAS) to a target storage by providing a mechanism to syncronze an initial known consistent crash backup point (i.e., starting point) for starting a continuous replication session between the shared memory (e.g. the source NAS) and a target storage. This mechanism eliminates the NAS vendor lock-in issue as the solution does not depend on compatible vendor services at source and target side.

One or more objects of the present disclosure is achieved by the solutions provided in the enclosed independent claims. Advantageous embodiments of the present disclosure are further defined in the dependent claims.

In one aspect, the present disclosure provides a memory controller being configured to be operatively connected to one or more clients for shared memory access, each client comprising an IO clock, and the memory controller being configured to perform a recovery of a shared memory determining a starting point for the recovery and then replicating the shared memory to a target file system based on the starting point, wherein the memory controller is characterized in that the memory controller is configured to determine the starting point by: generating a journal of file operations in the shared memory; generating a snapshot of the shared memory; restoring the shared memory as per the snapshot to the target file system; determining last operation before snapshot in journal of file operations; and setting next operation after the last operation as the starting point, and wherein the memory controller is configured to replicate the shared memory by replaying file operations according to the journal starting with the starting point.

The present disclosure provides an improved memory controller that provides a reliable, efficient, and accurate data replication and recovery mechanism by creating an initial consistent synchronization point of the shared memory (i.e., an active shared storage or the source NAS) with multiple NAS clients. The memory controller creates the initial consistent synchronization point without introducing any noticeable latency (i.e., very minimal and negligible latency) in the data flow between NAS clients and the shared memory, and without any additional shared content read (or reread) requirement at the shared memory for replication. The memory controller allows to replicate incremental changes to data in files without any fear of data loss, which is very crucial in case of disaster recovery. By virtue of restoring data to the target file system by restoring the snapshot and subsequent operations after snapshot in the journal, a high granularity consistent replication of the shared memory is created. Beneficially, the present disclosure works in a completely distributed fashion such that each of the one or more clients is responsible for its own journaling. And thus the present disclosure does not require any complete pause in production of input-output operations. The memory controller seamlessly works with heterogeneous NAS servers, thereby eliminating the NAS vendor lock-in issue as the solution does not depend on compatible vendor services at source shared storage (i.e., source NAS) and target shared storage (i.e., target NAS).

In an embodiment, the memory controller is further configured to determine the last operation by setting an operation counter to initial value; start with first file operation in the journal; determine a result of the file operation; determine if the result of the file operation is observable in the target file system; decrease the counter if the file operation is observable and increase the counter if the file operation is not observable; determine if the counter reaches the initial value and if so set the file operation as the last operation, and if not proceed with the next file operation.

By virtue of determining the last operation by setting the operation counter, a next operation for the start of the replay of the operations from the journal to the target file system is designated. Thus, this next operation acts as initial known consistent crash backup point for starting a continuous replication session between the shared memory (e.g. a NAS source) and the target file system (e.g. a cloud storage).

In a further embodiment, the memory controller is further configured to determine an identifier for each file operation in the journal when generating the journal and store the identifier in a file operation identifier file until snapshot is generated; select the file operation with the newest time stamp in the file operation identifier file; determine if the result of the selected file operation is observable in the target file system; set the selected file operation as the last operation if the selected file operation is observable and set selected file operation as the starting point if the file operation is not observable.

By virtue of determining if file operation is observable in the target file system, the starting point is determined which enables continuous, efficient, and reliable replication session between the shared memory and the target file system.

In a further embodiment, the memory controller is further configured to build a map associating source and target identities with client identities and to replicate the shared memory by replaying file operations according to the journal starting with the starting point based on the map.

By virtue of replaying file operations according to the journal starting with the starting point based on the map a continuous replication session between the shared memory and the target file system is started which ensures there is no data loss.

In a further embodiment, the journal comprises file operations indicating a file operation between a source and a target and a time stamp for the file operation.

The journal comprises memory operations indicating the memory operation between the source and the target and the time stamp, to enable restore of memory operations after the snapshot. Thus, there is no data loss even in case of a disaster recovery.

In a further embodiment, the memory controller is further configured to generate the journal of file operations by causing clients to journal file operations, wherein the journal of files comprises a plurality of distributed journals of file operations.

By virtue of generating the journal by causing clients to journal file operations there is no need to completely pause file operations when snapshot is generated and restored to the target file system.

In a further embodiment, the memory controller is arranged for Network-attached storage (NAS).

The memory controller arranged for Network-Attached Storage (NAS) provides improved and reliable storage of data after establishing a starting point after last operation before the snapshot. Thus, reliable data recovery of the shared memory is ensured in any adverse event.

In another aspect, the present disclosure provides a method for use in a memory controller, the memory controller being configured to be operatively connected to one or more clients for shared memory access, and the method comprising performing a recovery of a shared memory determining a starting point for the recovery and then replicating the shared memory to a target file system based on the starting point, wherein the method is characterized in determining the starting point by: generating a journal of file operations in the shared memory; generating a snapshot of the shared memory; restoring the shared memory as per the snapshot to the target file system; determining a last operation before snapshot in journal of file operations; and setting next operation after the last operation as the starting point, and wherein the method comprises replicating the shared memory by replaying file operations according to the journal starting with the starting point.

The method achieves all the technical effects of the memory controller of the present disclosure.

In another aspect, the present disclosure provides a computer-readable media comprising instructions that when loaded into and executed by a memory controller enables the memory controller to execute the method of the previous aspect.

The computer-readable media achieves all the technical effects of the memory controller of the present disclosure.

It is to be appreciated that all the aforementioned embodiments can be combined. It has to be noted that all devices, elements, circuitry, units and means described in the present application could be implemented in the software or hardware elements or any kind of combination thereof. All operations which are performed by the various entities described in the present application as well as the functionalities described to be performed by the various entities are intended to mean that the respective entity is adapted to or configured to perform the respective operations and functionalities. Even if, in the following description of specific embodiments, a specific functionality or operation to be performed by external entities is not reflected in the description of a specific detailed element of that entity which performs that specific operation or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative embodiments construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1A:
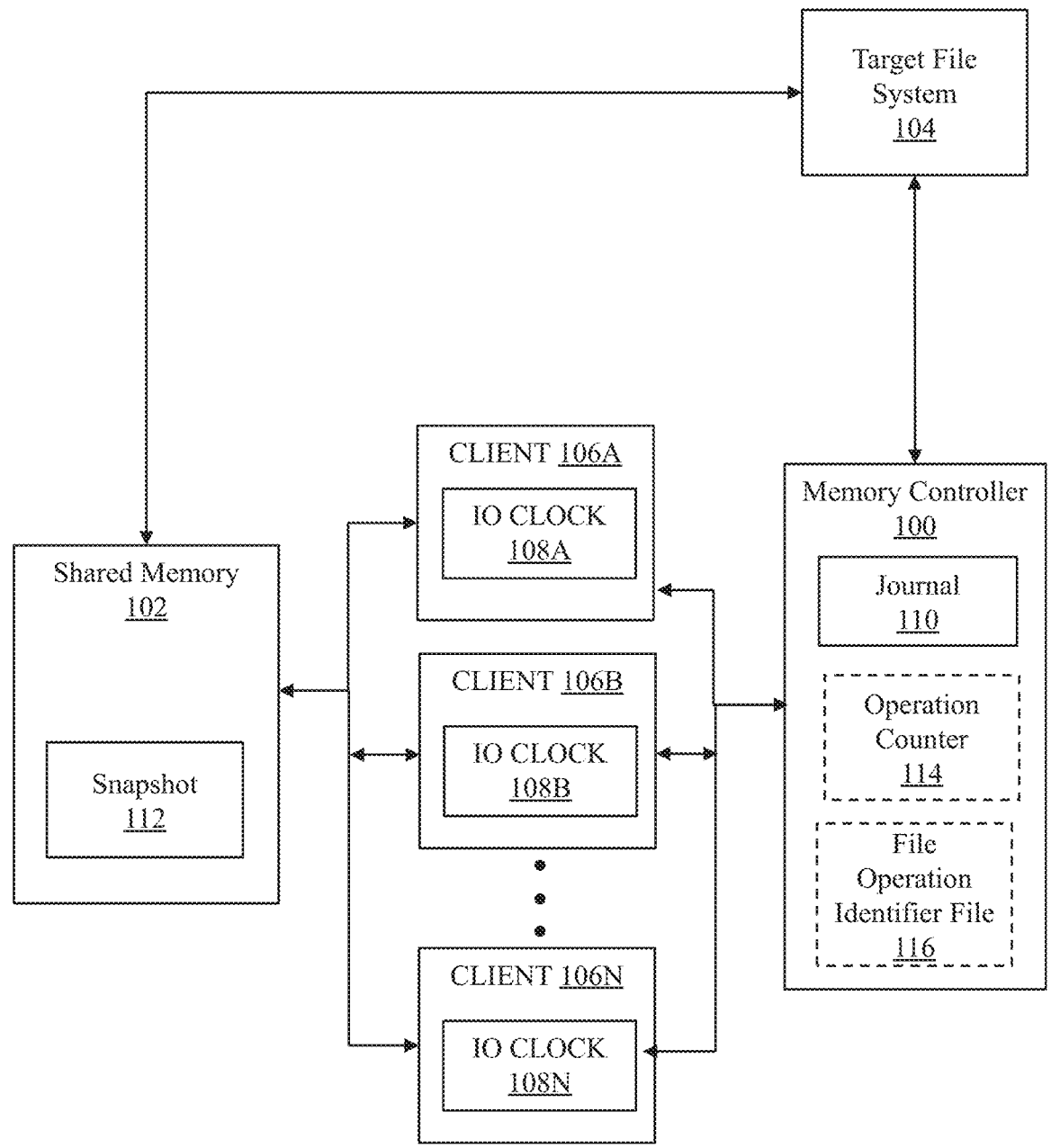
FIG. 1A is a block diagram of a memory controller connected to one or more clients for shared memory access, in accordance with an embodiment of the present disclosure.

FIG. 1A is a block diagram of a memory controller connected to one or more clients for shared memory access, in accordance with an embodiment of the present disclosure. With reference to FIG. 1A there is shown a network diagram that includes a memory controller 100, a shared memory 102, one or more clients 106A-106N each having an Input-Output (IO) clock 108A-108N, and a target file system 104. Each of the one or more clients 106A-106N include a corresponding Input-Output (IO) clock, such as IO clocks 108A-108N. There is further shown a journal 110, a snapshot 112, an operation counter 114, and a file operation identifier file 116.

In one aspect, the present disclosure provides a memory controller 100 being configured to be operatively connected to one or more clients 106A-106N for shared memory access, each client comprising an IO clock 108A-108N, and
the memory controller 100 being configured to perform a recovery of a shared memory 102
determining a starting point for the recovery and then
replicating the shared memory 102 to a target file system 104 based on the starting point, wherein the memory controller 100 is characterized in that the memory controller 100 is configured to determine the starting point by:
generating a journal 110 of file operations in the shared memory 102;
generating a snapshot 112 of the shared memory 102;
restoring the shared memory 102 as per the snapshot 112 to the target file system 104;
determining last operation before snapshot 112 in journal 110 of file operations; and
setting next operation after the last operation as the starting point, and wherein the memory controller 100 is configured to
replicate the shared memory 102 by replaying file operations according to the journal 110 starting with the starting point.

The memory controller 100 is configured to be operatively connected to one or more clients 106A-106N for shared memory access. The memory controller 100 refers a sequencer of file operations. The memory controller 100 includes suitable logic, circuitry, and interfaces that may be configured to communicate with the one or more clients 106A-106N, generate a journal of file operations, where the memory controller 100 causes the one or more NAS clients 106A-106N to journal file operations independently, and thus the journal generated may be consolidated journal that includes a plurality of distributed journals of file operations of the one or more clients 106A-106N. The memory controller 100 is configured to be operatively connected to the one or more clients 106A-106N via wired or wireless connections that can be carried out via any number of known protocols, including, but not limited to, Internet Protocol (IP), Local area network (LAN), Wireless Local area network (WLAN), or a wide area network (WAN). Examples of embodiments of the memory controller 100 may include, but is not limited to a sequencer, a central data processing device, and the like.

The shared memory 102 includes suitable logic, circuitry, and interfaces that may be configured to store the data received from the one or more clients 106A-106N. The shared memory 102 may store data received from the one or more clients 106A-106N along with a client identifier. The shared memory 102 refers to a network attached storage (NAS) source that supports multiple file-service protocols, and may enable users to share file data across different operating environments. In an example, the shared memory 102 may be a primary datacentre that include one or more hard disk drives, often arranged into logical, redundant storage containers or Redundant Array of Inexpensive Disks (RAID).

The target file system 104 includes suitable logic, circuitry, and interfaces that may be configured to receive the data as backup data from the shared memory 102, store the received data, and retrieve the received data when needed. The target file system 104 may be a cloud storage or other target storage. In an example, the shared memory 102 is a source Network-Attached Storage (NAS) which receives data from the one or more clients 106A-106N and the target file system 104 is a target Network-Attached Storage (NAS)-based cloud storage or other cloud storage, which receives backup data from the shared memory 102.

Each of the one or more clients 106A-106N refers to a client that is communicatively coupled to the shared memory 102 for data access and storage. The one or more clients 106A-106N may be a heterogeneous group of clients, where each of the one or more clients 106A-106N include suitable logic, circuitry, and interfaces that is configured to remotely access data from the shared memory 102. Each of the one or more clients 106A-106N may be NAS clients associated with a user who may perform specific file operations and further store the data associated with such file operations to the shared memory 102. Examples of the one or more clients 106A-106N include, but are not limited to, a NAS client, such as a laptop computer, a desktop computer, a smartphone, a thin client, a wireless modem, or other computing devices.

Each of one or more clients 106A-106N include an IO clock, such as the IO clocks 108A-108N. As shown, the client 106A includes the IO clock 108A, the client 106B includes the IO clock 108B, and so on. The IO clocks 108A-108N of the one or more clients 106A-106N are accurately synchronized to at least a resolution of time taken for an input/output NAS operation (i.e., a file operation).

In operation, a network share, such as the shared memory 102 (e.g., a NAS source) may be mounted and the one or more clients 106A-106A may be configured to communicate with the memory controller 100. The memory controller 100 may then send a request to the one or more clients 106A-106N to join high precision clock session, where each of the IO clocks 108A-108N of each client is synchronized with that of the memory controller 100. Thereafter, each of the one or more clients 106A-106N intercepts and journals its file operations, such as TO writes, reads, or other file operations, with respect to the shared memory 102. Each of the one or more clients 106A-106N may start sending its journal that includes file operations to the memory controller 100.

The memory controller 100 is configured to perform a recovery of the shared memory 102 by determining a starting point for the recovery and then replicating the shared memory 102 to a target file system 104 based on the starting point. The memory controller 100 is configured to receive journals from the one or more clients 106A-106N, process the received journals to determine the starting point. The starting point for the recovery is determined to enable tracking and identification of the data that is replicated to the target file system 104. Further, this prevents missing out of any data for replication to the target file system 104. Moreover, the starting point for the recovery is determined for an initial consistent synchronization point between the shared memory 102 and the target file system 104 to have consistency of data which prevents any data loss. Thus, the memory controller 100 of the present disclosure can store incremental changes from the one or more clients 106A-106N without any data loss.

The memory controller 100 is configured to determine the starting point by generating a journal 110 of file operations in the shared memory 102. The journal 110 is a data structure used for journaling, where in an event of a system failure, the journal ensures that the data has been restored to its pre-crash configuration. The journal 110 is used to record all the changes made in a file system. The journal 110 refers to a sequential log that is configured to indicate the file operations executed by one or more clients 106A-106N and time of the file operations. In an example, the journal 110 may be a distributed or consolidated journal that include a plurality of distributed journals of file operations of the one or more clients 106A-106N.

According to an embodiment, the journal 110 comprises file operations indicating a file operation between a source and a target and a time stamp for the file operation. The journal 110 comprises file operations indicating the file operation between the source (e.g., in this case, the one or more clients 106A-106N) and the target (in this case, the shared memory 102), where each file operation is time stamped. Examples of file operations include but are not limited to IO writes, cyclic redundancy check (CRC), IO read communicated from the one or more clients 106A-106N to the NAS source, such as the shared memory 102. In an example, a time stamp may refer to a time at which a given file operation was executed and recorded by each client, where the journal 110 consolidates all such file operations details and corresponding metadata.

According to an embodiment, the journal 110 further comprises inode details. The inode details includes attributes associated with the file operations. Such attributes may include metadata such as attributes, owners, timestamps, names, storage size and the like. Typically, the inode is a data structure in a given file system that describes a file-system object such as a file or a directory. Each inode stores the attributes and disk locations of the object's data. File-system object attributes may include metadata, as well as owner and permission data.

According to an embodiment, the memory controller 100 is further configured to generate the journal 110 of file operations by causing clients 106A-106N to journal file operations, wherein the journal of files comprises a plurality of distributed journals of file operations. Each of the one or more clients 106A-106N is configured journal its respective file operations. In an example, the memory controller 100 is configured to receive the journals of file operations from the one or more clients 106A-106N and further generate the journal 110. The use of the journal 110 in data replication and recovery ensures there is no latency introduced in the data flow in the production data path between the one or more clients 106A-106N (i.e., the NAS clients) and the shared memory 102 (e.g., the NAS source) in the present disclosure.

According to an embodiment, each client 106A-106N comprising an IO clock, such as the IO clocks 108A-108N, and wherein the memory controller 100 is further configured to synchronize IO clocks 108A-108N before generating the journal 110. The IO clocks 108A-108N are synchronized before generating the journal 110 to store the file operations in the journal 110 in a synchronization manner. Further, as the journal 110 is generated based on the journals of file operations from the one or more clients 106A-106N, the synchronization of IO clocks 108A-108N enables efficient retrieval of data from the target file system 104 when needed during recovery.

According to an embodiment, the memory controller 100 is further configured to synchronize the IO clocks 108A-108N to a time taken for file operation or less. In an example, the IO clocks 108A-108N are synchronized up to an accuracy that corresponds to the time taken for execution of the file operation. By virtue of synchronizing the IO clocks 108A-108N, the journal 110 is created and further stored in the target file system 104. This synchronization enables efficient retrieval of data from the target file system 104 when needed.

The memory controller 100 is further configured to determine the starting point by generating a snapshot 112 of the shared memory 102. The snapshot 112 herein refers to a copy of the shared memory 102. The snapshot 112 is generated to capture a file system state of the shared memory 102. In an example, the snapshot 112 of the shared memory 102 includes all the file operations executed by the one or more clients 106A-106N before the snapshot 112. In another example, the snapshot 112 of the shared memory 102 may include any other storage data provided by the one or more clients 106A-106N. In an exemplary embodiment, the snapshot 112 may be a copy of a virtual machine's disk file (VMDK) of the shared memory 102 at a given point in time.

According to an embodiment, the memory controller 100 is further configured to backup the snapshot 112 to the target file system 104. The snapshot 112 is configured to be stored in the target file system 104 to enable creating a backup of data of the shared memory 102. This backup can be retrieved whenever needed. In an example, the snapshot 112 includes a large amount of data. This is done to ensure time taken for the journal 110 to be generated and restored, is very less and thus, disaster recovery can be executed when needed without any loss of the data.

According to an embodiment, the snapshot 112 includes inode mapping for sources in file operations. The inode mapping is used to map source inode to target inode at a time when the snapshot 112 is restored to the target file system 104. The inode mapping includes a name (file or directory) associated with the source inode. In an example, the source inode refers to inode details of the file operation at the shared memory 102 and the target inode refers to inode details of the file operation at the target file system 104.

The memory controller 100 is further configured to determine the starting point by restoring the shared memory 102 as per the snapshot 112 to the target file system 104. The shared memory 102 is restored to the target file system 104 as per the snapshot 112 to enable protecting and recovering the data (i.e., file operations) in an event of data loss at the shared memory 102. Examples of the event of data loss may include, but is not limited to, data corruption, hardware or software failure in shared memory 102, accidental deletion of data, hacking, or malicious attack. In an example, the snapshot 112 includes a large amount of data. This is done to ensure time taken for restoring file operations stored in the journal 110 after the snapshot 112 is very less and thus, disaster recovery can be executed when needed without any loss of the data.

The memory controller 100 is further configured to determine the starting point by determining last operation before snapshot 112 in journal 110 of file operations. The last operation before snapshot 112 in journal 110 of file operations is determined by examining the journal 110. The last operation enables in determining a newest point in time at which the data in the journal 110 is consistent with the target file system 104. The determination of the last operation before snapshot 112 in the journal 110 further ensures there is no loss of data, i.e., no file operation capture is lost during restoring of data to the target file system 104.

The memory controller 100 is further configured to determine the starting point by setting next operation after the last operation as the starting point, and wherein the memory controller 100 is configured to replicate the shared memory 102 by replaying file operations according to the journal 110 starting with the starting point. In other words, a determination process by the memory controller 100 identifies the last operation that was executed before the snapshot 112 and designate the next operation for the start of the replay of the operations. Thus, the next operation after the last operation before the snapshot 112 acts as an initial known consistent crash backup point for starting a continuous replication session between the shared memory 102 and the target file system 104. Typically, a backup of the snapshot 112 of the source share, such as the shared memory 102, can be restored to the target, such as the target file system 104 of a target storage, but then the source, such as the shared memory 102, has changed because the one or more clients 106A-106N are still working. In the present disclosure, the problem of creating a consistent starting point for the replication is solved by first determining the starting point and then replaying the file operations according to the journal 110 starting with the starting point. In other words, the current data in the source share is reliably and adequately copied to the target (i.e., the target file system 104 of the target storage) even if the shared memory 102 is in constant use by multiple clients, such as the one or more clients 106A-106N by replaying the file operations according to the journal 110 starting with the starting point. Thus, the issues of initial journal sync of a shared file system, such as of the shared memory 102, which is replicated continually based on actions of share consumers or clients, is solved.

According to an embodiment, the memory controller 100 is further configured to determine the last operation by setting an operation counter 114 to initial value; start with first file operation in the journal 110; determine a result of the file operation; determine if the result of the file operation is observable in the target file system 104; decrease the counter 114 if the file operation is observable and increase the counter 114 if the file operation is not observable; determine if the counter 114 reaches the initial value and if so set the file operation as the last operation, and if not proceed with the next file operation. The operation counter 114 is configured to maintain a count of the file operation which are observable in the target file system 104. The result of the file operation is observable in the target file system 104 when the result of the file operation is already stored via the snapshot 112. In an example, a file operation is suspected positive if a post condition (i.e., result) of the file operation is entirely observable in the state of the target file system 104. Further, a file operation is definitely negative if there is any contradiction between the post condition (i.e., result) of the file operation and the state of the target file system 104. If the operation counter 114 was positive and drops back to zero, this operation is a potentially last operation prior to the snapshot 112. This process of determining the last operation is completed successfully when at least one time when the counter 114 is dropped to zero and the corresponding operation is identified as the potentially last operation prior to the snapshot 112. Thus, the journal 110 is replayed at the target file system 104 after this last operation. The first file operation is a file operation with an earliest time stamp and the next file operation is a file operation with the next closest time stamp. By virtue of determining the last operation by setting the operation counter 114, a next operation for the start of the replay of the operations from the journal 110 to the target file system 104 is designated. Thus, this next operation acts as initial known consistent crash backup point for starting a continuous replication session between the shared memory 102 and the target file system 104.

According to an embodiment, the memory controller 100 is further configured to determine an identifier for each file operation in the journal 110 when generating the journal 110 and store the identifier in a file operation identifier file 116 until snapshot 112 is generated; select the file operation with the newest time stamp in the file operation identifier file 116; determine if the result of the selected file operation is observable in the target file system 104; set the selected file operation as the last operation if the selected file operation is observable and set selected file operation as the starting point if the file operation is not observable. The file operation identifier file 116 is an unambiguous identifier of the file operation written to a hidden file on the shared memory 102. After restoring to the target file system 104, these files are read. The last operation is identified by choosing the file operation with the newest timestamp. In an example, the newest timestamp of the file operation is newest compared to a file operation suspected before. In an example, if this operation is definite negative, the journal 110 is replayed with this operation and if this operation is suspected positive, the journal 110 is replayed with the next operation. By virtue of determining if file operation is observable in the target file system 104, the starting point is determined which enables continuous replication session between the shared memory 102 and the target file system 104.

According to an embodiment, a file operation is observable if there is no contradiction between the result of the operation and the target volume and a file operation is not observable if there is a contradiction between the result of the operation and the target volume. When the result of the file operation is already stored via the snapshot 112 then there is no contradiction between the result of the operation and the target volume. The term target volume is interchangeably used for the term target file system 104.

According to an embodiment, the memory controller 100 is further configured to build a map associating source and target identities with client identities and to replicate the shared memory 102 by replaying file operations according to the journal 110 starting with the starting point based on the map. There are two kinds of operations broadly: 1) operations at the inode level (e.g. change attributes, owners, timestamps, file or directory renames, etc.); and 2) operations at the data level (e.g. writes to the file). If the operation is an inode operation, the map is used to find the target files or directories and check if the effect of the operation is observable in that inode of source or target. The map enables in associating source and target identities with file identifiers to identify file operations of each of the clients 106A-106N. The map may be referred to as a inode map or a source to target inode map that establishes a relationship in terms of mapping a source inode to a target inode at the time when the source backup was made and that backup was restored. The map includes the name (file or directory) associated with the source inode. In other words, the map associates real identities of operations with inode log ids. The details of any source operation can be found in the inode map. Moreover, in the case of an inode operation, the result and sequence number of this operation is recoded in the inode entries of all the inodes in the map (i.e. source to target inode map). In the case of a data operation, the result, sequence number of this operation and the extent is recoded in the entry for this inode in the map (i.e. source to target inode map). In an example, the client identities refer to identifiers used to identify file operations of each of the clients 106A-106N. In an example, the source and the target identities refer to identifiers associated with shared memory 102 and the target file system 104 respectively. The shared memory 102 is replicated by replaying journal 110 with the starting point based on the map to prevent any data loss while storing the file operations in the target file system 104. By virtue of replaying file operations according to the journal 110 starting with the starting point based on the map a continuous replication session between the shared memory 102 and the target file system 104 is started which ensures there is no data loss.

According to an embodiment, the memory controller 100 is further configured to build the map by when determining if the file operation is observable determine if the file operation is an inode operation and if so record the result and sequence number of the file operation for all relevant nodes in the map, or if the file operation is a data operation and if so record the result and sequence number of the file operation for the relevant node in the map. In other words, in the case of the inode operation, if the file operation is observable, the result and the sequence number of this operation in inode entries of all the inodes in the map are recorded. In the case of the data operation, the result, the sequence number of this operation and this extent in the entry for this inode in the map are recorded. The inode operation refers to operations at the inode level (for example, change attributes, owners, timestamps, renames and the like). The data operation refers to operations at the data level (for example, writes to a file).

In an example, some file operations cancel out the effect of previous operations. For example, an extent in a file may be overwritten multiple times in course of examining the journal 110 and may contain correct data any number of times. At one of these suspected positive times, the data will be correct. An inode is suspected positive only if all the extents in the inode are in suspected positive state. However, overall, each inode has a sequence of definitely negative and suspected positive states.

According to an embodiment, the memory controller 100 is further configured to determine if a file operation is observable by determining if the file operation is an inode operation, and if so use the map to find the target inode and check if the effect of the operation is observable in that target inode, or determining if the file operation is a data operation, and if so read the relevant data in the target file and compare it to the data of the file operation. In other words, if the operation is an inode operation, the map is used to find target files/directories (i.e., target inode) and check if the effect of the operation is observable in that inode. If the operation is a data operation, the relevant data is read in the target file system 104 and compared to the data in the operation. Thus, if the file operation is observable in the target file system 104 then the file operation is already stored via the snapshot 112.

The present disclosure provides an improved memory controller 100 (i.e., a sequencer unit) that enables to create an initial consistent synchronization point of the shared memory 102 (i.e., an active shared storage or the source NAS) with multiple clients 106A-106N, which in turn ensures reliable data recovery of the shared memory 102 (i.e., the source NAS) in any adverse event. The memory controller 100 creates the initial consistent synchronization point without introducing any latency in the data flow between the one or more clients 106A-106N and the shared memory 102 and without any additional need to reread shared content at the shared memory 102. The memory controller 100 allows to replicate incremental changes to data in files without any fear of data loss, which is crucial in case of disaster recovery. By virtue of restoring data to the target file system 104 by restoring the snapshot 112 and subsequent operations after snapshot 112 in the journal 110 a high granularity consistent replication of the shared memory 102 is created. Beneficially, the present disclosure works in a completely distributed fashion such that each of the one or more clients 106A-106N is responsible for its own journaling. And thus, the present disclosure does not require any complete pause in production input-output operations. The memory controller 100 seamlessly works with heterogeneous NAS servers or even block devices, thereby eliminating the NAS vendor lock-in issue as the solution does not depend on compatible vendor services at source shared storage (i.e., source NAS) and target shared storage.

Figure 1B:
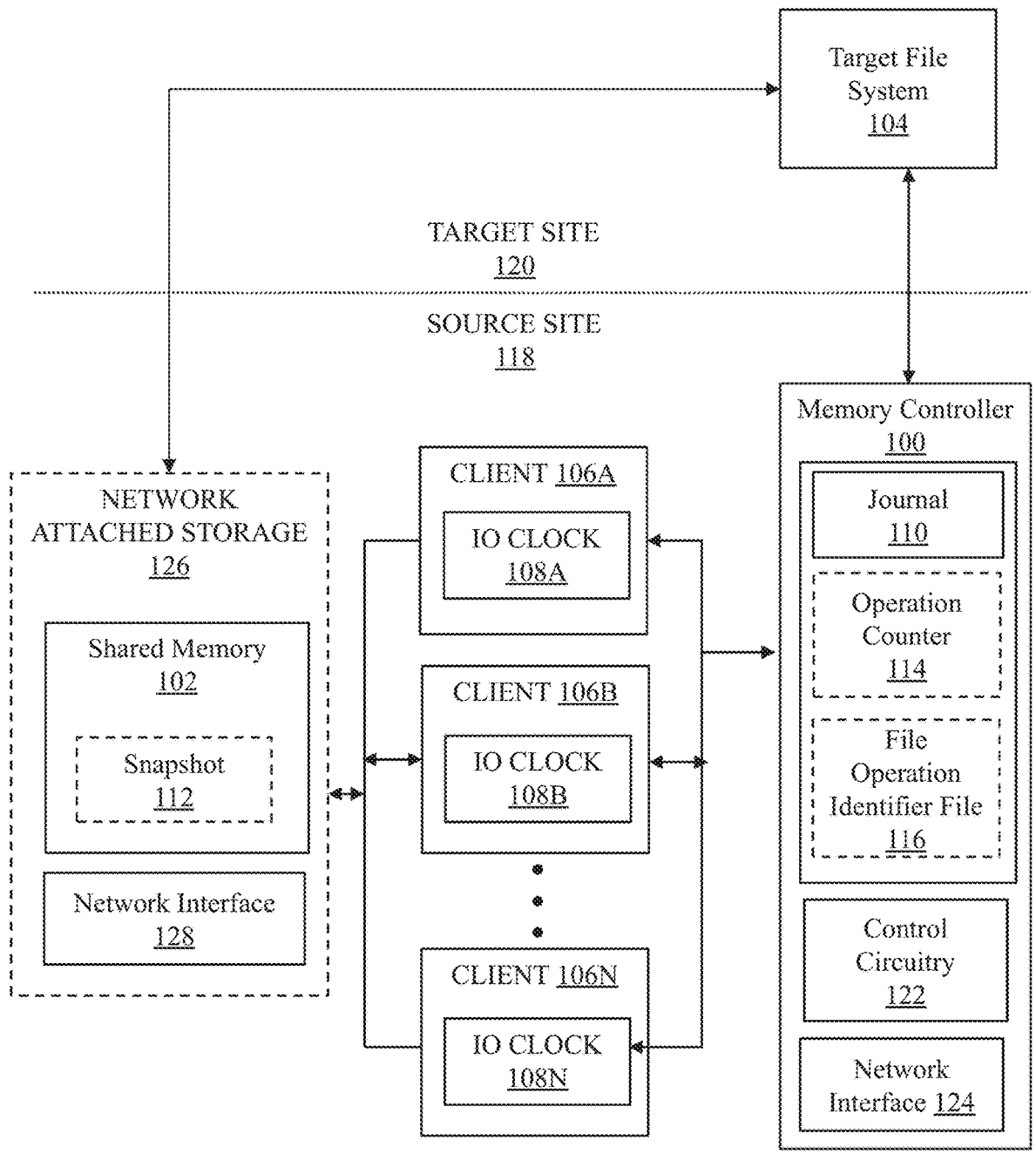
FIG. 1B is a block diagram of a memory controller connected to one or more clients for shared memory access, in accordance with another embodiment of the present disclosure.

FIG. 1B is a block diagram of a memory controller connected to one or more clients for shared memory access, in accordance with another embodiment of the present disclosure. With reference to FIG. 1B there is shown the memory controller 100. There is shown the memory controller 100 arranged for a Network-Attached Storage (NAS) 126. The NAS 126 may include a NAS head, such as a network interface 128, and the shared memory 102 (e.g., a NAS storage array). There is further shown the memory controller 100 arranged for the NAS 126 and communicatively coupled to the one or more clients 106A-106N and the target file system 104. As shown, the memory controller 100, the Network-Attached Storage (NAS) 126, and the one or more clients 106A-106N are arranged in the source site 118, whereas the target file system 104 is arranged at the target site 120.

The memory controller 100 is arranged for Network-attached storage (NAS) 126. The NAS 126 refers to a source NAS, which receives data from the one or more clients 106A-106N. In such an example, the target file system 104 is a target storage, such as a cloud storage, which receives backup data from the source NAS, i.e., NAS 126. The target storage may be a NAS-based target or other types of secondary storage. The memory controller 100 arranged for Network-Attached Storage (NAS) 126 provides improved and reliable storage of data without the need to re-read all data from the NAS 126 for replication and recovery.

In an embodiment, the memory controller 100 further includes a control circuitry 122 and a network interface 124. In such an embodiment, the operations executed by the memory controller 100 may be executed and controlled by the control circuitry 122. Examples of the control circuitry 122 may include, but is not limited to, a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or control circuitry. The network interface 124 of the memory controller 100 includes suitable logic, circuitry, and/or interfaces that is configured to communicate with the one or more clients 106A-106N, the NAS 126, and the target file system 104.

The network interface 128 of the NAS 126 includes suitable logic, circuitry, and/or interfaces that may be configured to communicate with one or more external devices, such as the target file system 104 and the one or more clients 106A-106N. Examples of the network interface 128 may include, but is not limited to, an antenna, a NAS head, a telematics unit, a radio frequency (RF) transceiver, one or more amplifiers, one or more oscillators, a digital signal processor, a coder-decoder (CODEC) chipset, and/or a subscriber identity module (SIM) card.

Figure 2:
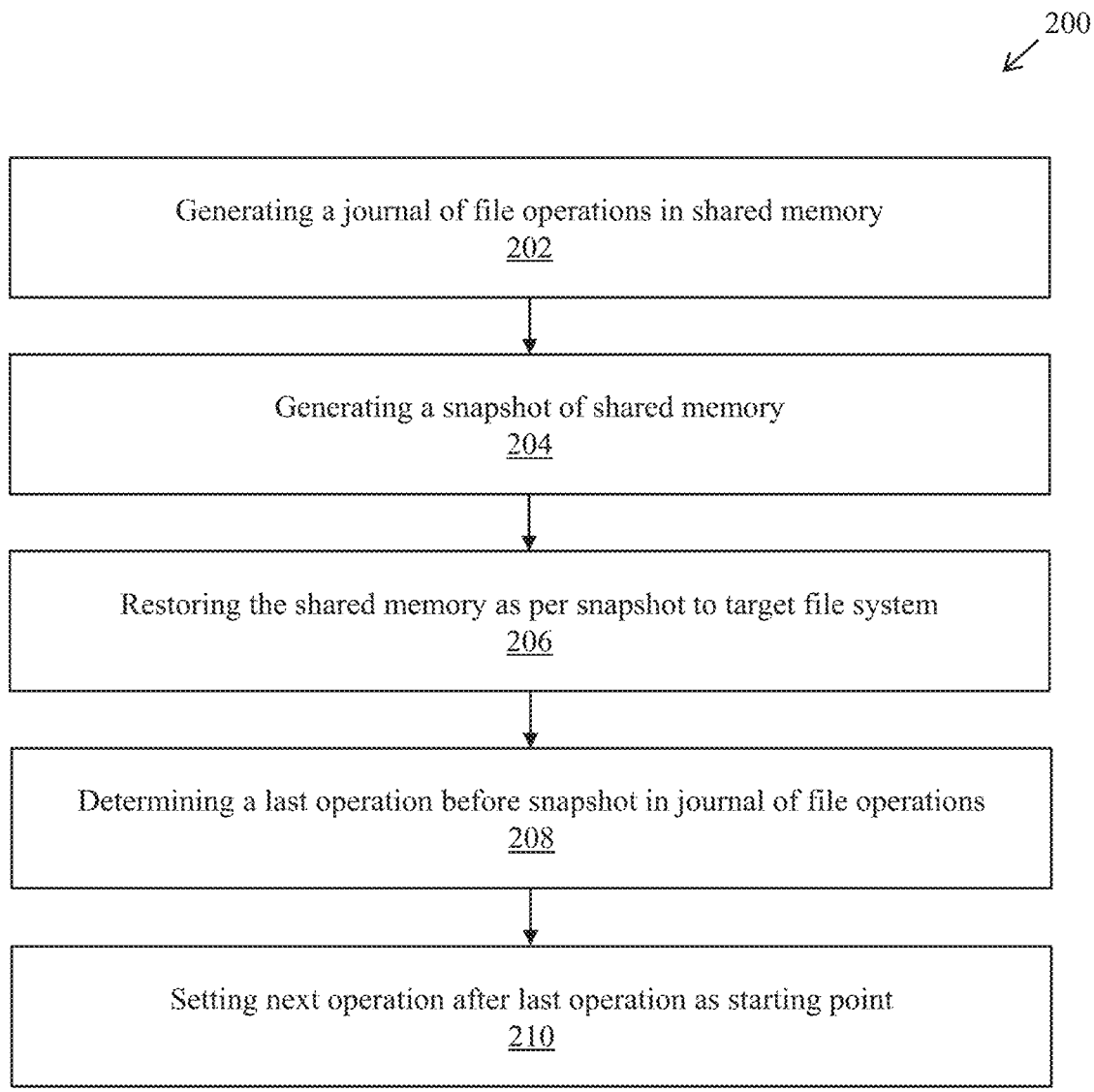
FIG. 2 is a flowchart of a method for use in a memory controller, in accordance with an embodiment of the present disclosure.

FIG. 2 is a flowchart of a method for use in a memory controller, in accordance with an embodiment of the present disclosure. With reference to FIG. 2 there is shown a method 200. FIG. 2 is described in conjunction with elements of FIGS. 1A and 1B. The method 200 is executed at a memory controller 100 described, for example, in FIGS. 1A and 1B. The method 200 includes operations 202 to 210.

In another aspect, the present disclosure provides a method 200 for use in a memory controller 100, the memory controller 100 being configured to be operatively connected to one or more clients 106A-106N for shared memory access, and the method 200 comprising performing a recovery of a shared memory 102 by
determining a starting point for the recovery and then replicating the shared memory 102 to a target file system 104 based on the starting point, wherein the method 200 is characterized in determining the starting point by:
generating a journal 110 of file operations in the shared memory 102;
generating a snapshot 112 of the shared memory 102;
restoring the shared memory 102 as per the snapshot 112 to the target file system 104;
determining a last operation before snapshot 112 in journal 110 of file operations; and
setting next operation after the last operation as the starting point, and wherein the method 200 comprises replicating the shared memory 102 by replaying file operations according to the journal 110 starting with the starting point.

The method 200 comprises performing a recovery of a shared memory 102 by determining a starting point for the recovery and then replicating the shared memory 102 to a target file system 104 based on the starting point. The method 200 comprises receiving journals from the one or more clients 106A-106N, processing the received journals to determine the starting point. The starting point for the recovery is determined to enable tracking and identification of the data that is replicated to the target file system 104. Further, this prevents missing out of any data for replication to the target file system 104. Moreover, the starting point for the recovery is determined to enable having an initial consistent synchronization point between the shared memory 102 and the target file system 104 to have consistency of data which prevents any data loss. Thus, the method 200 enables storing incremental changes from the one or more clients 106A-106N without any data loss.

The method 200 comprises determining the starting point by performing various operations, such as the operations 202 to 210.

At operation 202, the method 200 comprises generating a journal 110 of file operations in the shared memory 102. The method 200 comprises determining the starting point by generating the journal 110 to indicate the file operations executed by one or more clients 106A-106N and time of the file operations. In an example, the journal 110 may be a consolidated journal that include a plurality of distributed journals of file operations of the one or more clients 106A-106N.

According to an embodiment, the method 200 further comprises generating the journal 110 of file operations by causing clients 106A-106N to journal file operations, wherein the journal of files comprises a plurality of distributed journals of file operations. Each of the one or more clients 106A-106N generates own journal for respective file operations thus, the journals of file operations are distributed in nature at each client of one or more clients 106A-106N. In an example, the method 200 comprises receiving the journals of file operations from the one or more clients 106A-106N and further generating the journal 110.

According to an embodiment, in the method 200 each client 106A-106N comprises an IO clock 108A-108N and wherein the method 200 further comprises synchronizing IO clocks 108A-108N before generating the journal 110. The IO clocks 108A-108N are synchronized before generating the journal 110 to store the file operations in the journal 110 in a synchronization manner. Thus, when the journal 110 is restored in the target file system 104, an efficient retrieval of the data from the target file system 104 can be executed without any data loss. Further, as the journal 110 is generated based the journals of file operations from the one or more clients 106A-106N thus, synchronization of IO clocks 108A-108N enables efficient retrieval of data from the target file system 104 when needed.

At operation 204, the method 200 further comprises generating a snapshot 112 of the shared memory 102. The determining of the starting point is performed further by the generating of the snapshot 112. The snapshot 112 herein refers to a copy of the shared memory 102. The method 200 comprises generating the snapshot 112 to capture a file system state of the shared memory 102. In an example, the snapshot 112 of the shared memory 102 includes all the file operations executed by the one or more clients 106A-106N before the snapshot 112. In an exemplary embodiment, the snapshot 112 may be a copy of a virtual machine's disk file (VMDK) of the shared memory 102 at a given point in time.

According to an embodiment, the method 200 further comprises backing up the snapshot 112 to the target file system 104. The snapshot 112 is stored in the target file system 104 to enable creating a backup of the shared memory 102. This backup can be retrieved whenever needed. In an example, the snapshot 112 includes a large amount of data. This is done to ensure time taken for the journal 110 to be generated and restored, is very less and thus, disaster recovery can be executed when needed without any loss of the data.

At operation 206, the method 200 further comprises restoring the shared memory 102 as per the snapshot 112 to the target file system 104. The determining of the starting point is performed further by restoring the shared memory 102 as per the snapshot 112 to the target file system 104. The method 200 comprises restoring the shared memory 102 to the target file system 104 as per the snapshot 112 to enable protecting and recovering the data (i.e., file operations) in an event of data loss at the shared memory 102. This is done to ensure time taken for restoring file operations stored in the journal 110 after the snapshot 112 is very less and thus, disaster recovery can be executed efficiently and reliably when needed without any loss of the data.

At operation 208, the method 200 further comprises determining a last operation before snapshot 112 in the journal 110 of file operations. The determining of the starting point is performed further by determining the last operation before the snapshot 112 in the journal 110. The last operation before snapshot 112 in journal 110 of file operations is determined by examining the journal 110. The last operation enables in determining a newest point in time at which the data in the journal 110 is consistent with the target file system 104. The determination of the last operation before snapshot 112 in the journal 110 further ensures there is no loss of data i.e., no operation is lost during restoring of data to the target file system 104.

At operation 210, the method 200 further comprises setting next operation after the last operation as the starting point, and wherein the method 200 comprises replicating the shared memory 102 by replaying file operations according to the journal 110 starting with the starting point. The determining of the starting point is performed further by setting the next operation just after the last operation as the starting point. In other words, a determination process in the method 200 identifies the last operation that was executed before the snapshot 112 and designate the next operation for the start of the replay of the replicated operations. Thus, the next operation after the last operation before the snapshot 112 acts as an initial known consistent crash backup point for starting a continuous replication session between the shared memory 102 and the target file system 104.

According to an embodiment, the method 200 further comprises determining the last operation by setting an operation counter 114 to initial value; starting with first file operation in the journal 110; determining a result of the file operation; determining if the result of the file operation is observable in the target file system 104; decreasing the counter 114 if the file operation is observable and increasing the counter 114 if the file operation is not observable; determining if the counter 114 reaches the initial value and if so set the file operation as the last operation, and if not proceed with the next file operation. The method 200 comprises maintaining, by the operation counter 114, a count of the file operation which are observable in the target file system 104. The result of the file operation is observable in the target file system 104 when the result of the file operation is already stored via the snapshot 112. In an example, a file operation is suspected positive if a post condition (i.e., result) of the file operation is entirely observable in the state of the target file system 104. Further, a file operation is definitely negative if there is any contradiction between the post condition (i.e., result) of the file operation and the state of the target file system 104. If the operation counter 114 was positive and drops back to zero, this operation is a potentially last operation prior to the snapshot 112. This process of determining the last operation is completed successfully when at least one time when the counter 114 is dropped to zero and the corresponding operation is identified as the potentially last operation prior to the snapshot 112. Thus, the journal 110 is replayed at the target file system 104 after this last operation.

According to an embodiment, the method 200 further comprises determining an identifier for each file operation in the journal 110 when generating the journal 110 and storing the identifier in a file operation identifier file 116 until snapshot 112 is generated; selecting the file operation with the newest time stamp in the file operation identifier file 116; determining if the result of the selected file operation is observable in the target file system 104; setting the selected file operation as the last operation if the selected file operation is observable and setting selected file operation as the starting point if the file operation is not observable. The file operation identifier file 116 is an unambiguous identifier of the file operation written to a hidden file on the shared memory 102. After restoring to the target file system 104, these files are read. The last operation is identified by choosing the file operation with the newest timestamp. In an example, the newest timestamp of the file operation is newest compared to a file operation suspected before. In an example, if this operation is definite negative, the journal 110 is replayed with this operation and if this operation is suspected positive, the journal 110 is replayed with the next operation.

According to an embodiment, the method 200 further comprises building a map associating source and target identities with client identities and replicating the shared memory 102 by replaying file operations according to the journal 110 starting with the starting point based on the map. The shared memory 102 is replicated by replaying journal 110 with the starting point based on the map to prevent any data loss while storing the file operations in the target file system 104.

According to an embodiment, the method 200 further comprises building the map by when determining if the file operation is observable determining if the file operation is an inode operation and if so record the result and sequence number of the file operation for all relevant nodes in the map, or if the file operation is a data operation and if so record the result and sequence number of the file operation for the relevant node in the map. In other words, in the case of the inode operation, if the file operation is observable, the result and the sequence number of this operation in inode entries of all the inodes in the map are recorded. In the case of the data operation, the result, the sequence number of this operation and this extent in the entry for this inode in the map are recorded.

According to an embodiment, the method 200 further comprises determining if a file operation is observable by determining if the file operation is an inode operation, and if so use the map to find the target inode and check if the effect of the operation is observable in that target inode, or determining if the file operation is a data operation, and if so reading the relevant data in the target file and comparing it to the data of the file operation. In other words, if the operation is an inode operation, the map is used to find target files/directories (i.e., target inode) and check if the effect of the operation is observable in that inode. If the operation is a data operation, the relevant data is read in the target file system 104 and compared to the data in the operation. Thus, if the file operation is observable in the target file system 104 then the file operation is already stored via the snapshot 112.

The present method 200 provides an improved memory controller 100 that enables to create an initial consistent synchronization point of the shared memory 102 (i.e., an active shared storage or the source NAS) with multiple clients 106A-106N, which in turn ensures reliable data recovery of the shared memory 102 (i.e., the source NAS) in any adverse event. The method 200 creates the initial consistent synchronization point without introducing any noticeable latency (i.e., very minimal and negligible latency) in the data flow and without any additional shared content read (or reread) requirement. The method 200 allows to replicate incremental changes to data in files without any fear of data loss, which is very crucial in case of disaster recovery. By virtue of restoring data to the target file system 104 by restoring the snapshot 112 and subsequent operations after snapshot 112 in the journal 110 a high granularity consistent replication of the shared memory 102 is created. Beneficially, the present method 200 works in a completely distributed fashion such that each of the one or more clients 106A-106N is responsible for its own journaling. And thus the present method 200 does not require any complete pause in production of input-output operations. The method 200 seamlessly works with heterogeneous NAS servers, thereby eliminating the NAS vendor lock-in issue as the solution does not depend on compatible vendor services at source shared storage (i.e., source NAS) and target shared storage (i.e., target NAS).

In another aspect, the present disclosure provides a computer-readable media comprising instructions that when loaded into and executed by a memory controller 100 enables the memory controller 100 to execute the method 200. The computer-readable media refers to a non-transitory computer-readable storage medium. Examples of embodiments of the computer-readable medium include, but is not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory.

Figure 3:
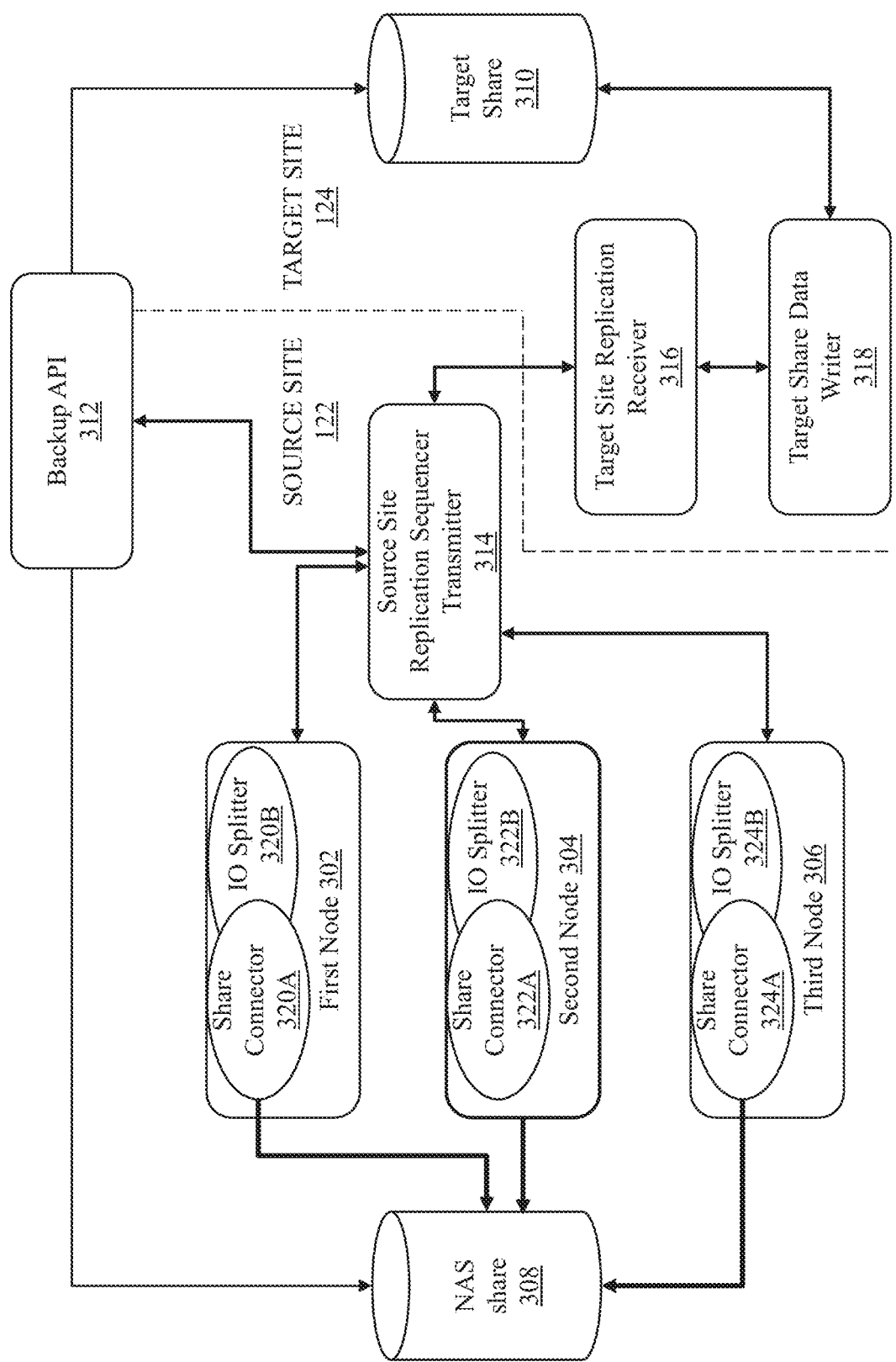
FIG. 3 is an exemplary illustration of shared memory access by one or more clients, in accordance with an embodiment of the present disclosure.

FIG. 3 is an illustration of an exemplary scenario of a method and a system for shared memory access by NAS clients, in accordance with an embodiment of the present disclosure. FIG. 3 is described in conjunction with elements of FIGS. 1A and 1B. With reference to FIG. 3, there is shown an exemplary multi-node continues replication system in the exemplary scenario that includes a first node 302, a second node 304, a third node 306, a Network-Attached Storage (NAS) share 308, a target share 310, a backup application programming interface (API) 312, a source site replication sequencer transmitter 314, a target site replication receiver 316 and a target share data writer 318. The first node 302 includes a share connector 320A and an Input-Output (10) splitter 320B. Similarly, the second node 304 includes a share connector 322A and an Input-Output (10) splitter 322B. The third node 306 includes a share connector 324A and an Input-Output (10) splitter 324B.

In this scenario, there is shown a source site 118 that includes first node 302, the second node 304, the third node 306, the Network-Attached Storage (NAS) share 308 and the source site replication sequencer transmitter 314. There is further shown a target site 120 that includes the target share 310, the target site replication receiver 316 and the target share data writer 318.

In the exemplary scenario, the first node 302, the second node 304 and the third node 306 corresponds to NAS clients, such as one or more clients 106A-106106N respectively of FIG. 1A. The first node 302, the second node 304 and the third node 306 are configured to access the NAS share 308 for shared data storage using the share connector 320A, 322A, and 324A, respectively. The NAS share 308 may be a NAS source (e.g., the NAS 126 of FIG. 1B). The target share 310 refers to a target storage (e.g., the target file system 104 of FIG. 1A). The target share 310 is configured to store backup of the data that is stored in the NAS share 308. Each of the share connectors 320A, 322A, 324A is configured to provide data for storage in the NAS share 308.

In this case, each of IO splitter 320B, 322B, 324B refers to an agent which records file operation in timed interval, and transmits the data as datasets to the source site replication sequencer transmitter 314. The dataset represents both file operation and modified data at a certain point in time. The source site replication sequencer transmitter 314 is configured to collect records of IO operation transmitted in a form of datasets as a journal by the IO splitter 320B, 322B, 324B, process the datasets and transmit changes to the target site replication receiver 316. The source site replication sequencer transmitter 314 is further configured to generate a journal based on the IO operation received in the form of datasets from the multiple nodes, such as the first node 302, the second node 304 and the third node 306. The source site replication sequencer transmitter 314 is further configured to generate a snapshot of the NAS share 308 using the backup API 312. The source site replication sequencer transmitter 314 is further configured to start a snapshot-based backup of a shared file system of the NAS share 308 and restore it to a target file system at the target share 310. In other words, the source site replication sequencer transmitter 314 restores the data of the NAS share 308 to the target file system at the target share 310 as per the generated snapshot. The target site replication receiver 316 is configured to receive the journal of file operations post restore from the source site replication sequencer transmitter 314. Once the restore completes, the target site replication receiver 316 finds the last operation in the journal that occurred prior to the snapshot. Alternatively stated, the last operation before snapshot 112 in the journal of file operations is determined as actual replication starts from the next operation. Thereafter, the next operation after the last operation is set as the starting point. The target site replication receiver 316 by use of the target share data writer 318 is configured to replicate the NAS share 308 efficiently and reliably by only replaying the file operations according to the journal starting with the determined starting point. In this case, the source site replication sequencer transmitter 314 and the target site replication receiver 316 may be collectively referred to as a memory controller (e.g., the memory controller 100 of FIGS. 1A, and 1B).

Figure 4:
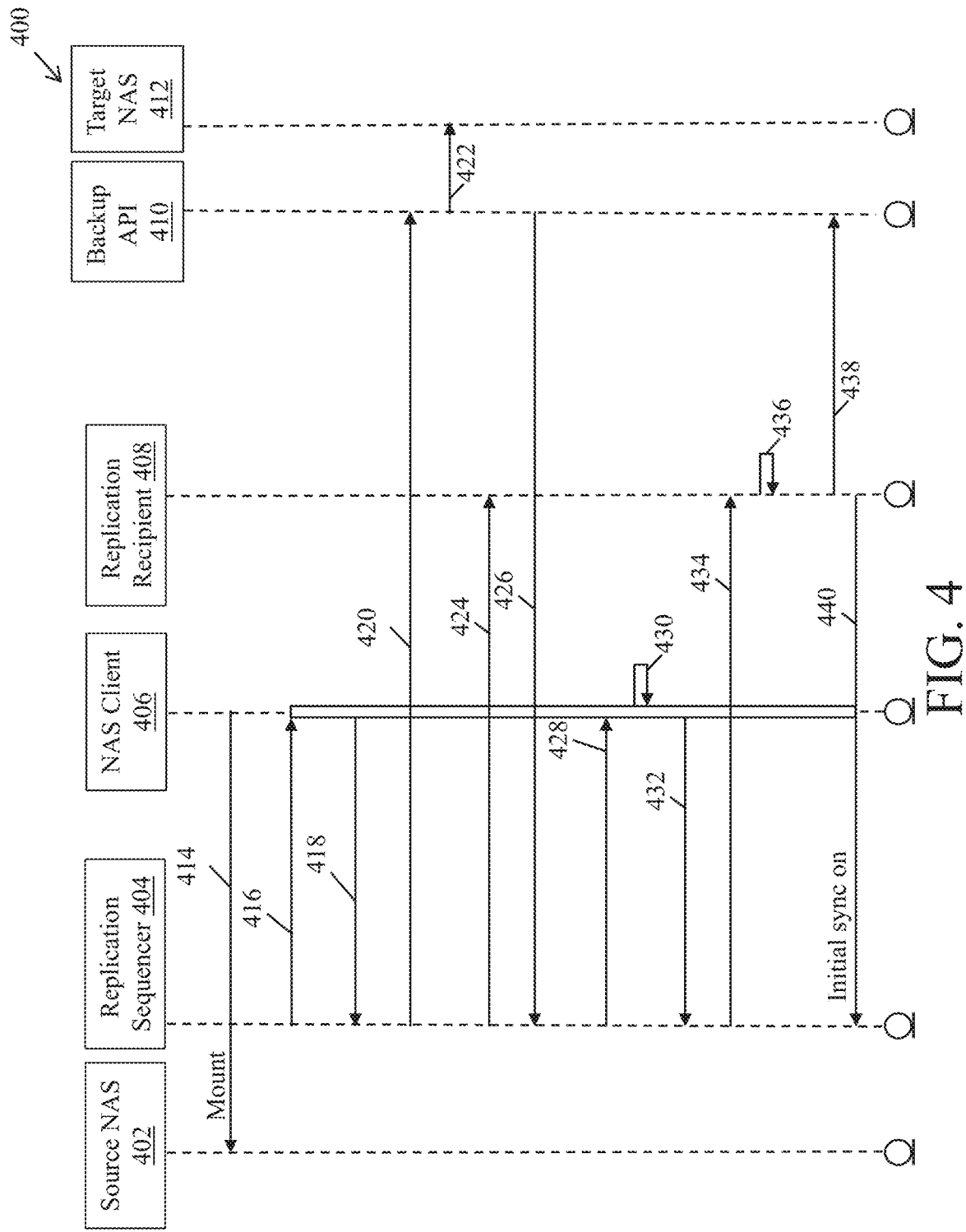
FIG. 4 is an exemplary line diagram of a method for shared memory access by one or more clients, in accordance with an embodiment of the present disclosure.

FIG. 4 is an exemplary sequence diagram of a method for shared memory access by one or more clients, in accordance with an embodiment of the present disclosure. FIG. 4 is described in conjunction with elements of FIGS. 1A and 1B. With reference to FIG. 4 there is shown a sequence diagram 400 that illustrates a sequence of operations executed at a source Network-Attached Storage (NAS) 402, a replication sequencer 404, a NAS client 406, a replication recipient 408, a backup application programming interface (API) 410 and a target NAS 412.

In the sequence diagram 400, the source NAS 402 corresponds to the shared memory 102 of FIG. 1A. Similarly, the operations of the replication sequencer 404 and the replication recipient 408 may collectively performed by the memory controller 100. Moreover, the target NAS 412 corresponds to the target file system 104 (of FIG. 1A).

At operation 414, the NAS clients 406 sends a request to the source NAS 402 to mount the source NAS 402. At operation 416, the replication sequencer 404 sends a notification to each of the NAS clients 406 to join a high precision clock session. At operation 418, the NAS clients 406 starts sending 10 operations (i.e., file operations) in the form of journals to the replication sequencer 404. At operation 420, the replication sequencer 404 sends an instruction to the backup API 410 to create a backup and restore of the source NAS 402 at the target NAS 412. At operation 422, the backup API 410 restores the backup to the target NAS 412 as per a snapshot of the source NAS 402. At operation 424, the replication recipient 408 receives the journal of file operations (10 journal) from the replication sequencer 404. At operation 426, the backup API 410 notifies the replication sequencer 404 that the backup is done. At operation 428, the replication sequencer 404 notifies the NAS clients 406 that an application-consistent snapshot is created. At operation 430, the NAS clients 406 marks the journal as application consistent. At operation 432, the NAS clients 406 sends the journal to the replication sequencer 404. At operation 434, the replication recipient 408 receives post restore journal from the replication sequencer 404. At operation 436, the replication recipient 408 determines the last operation in journal that occurred prior to the snapshot.

At operation 438, the backup API 410 replays the journal until the application consistent mark is achieved. At operation 440, the replication recipient 408 signals to the replication sequencer 404 that an initial synchronization is on. The next operation after the last operation is set as the starting point and replication starts from the next operation.

Figure 5:
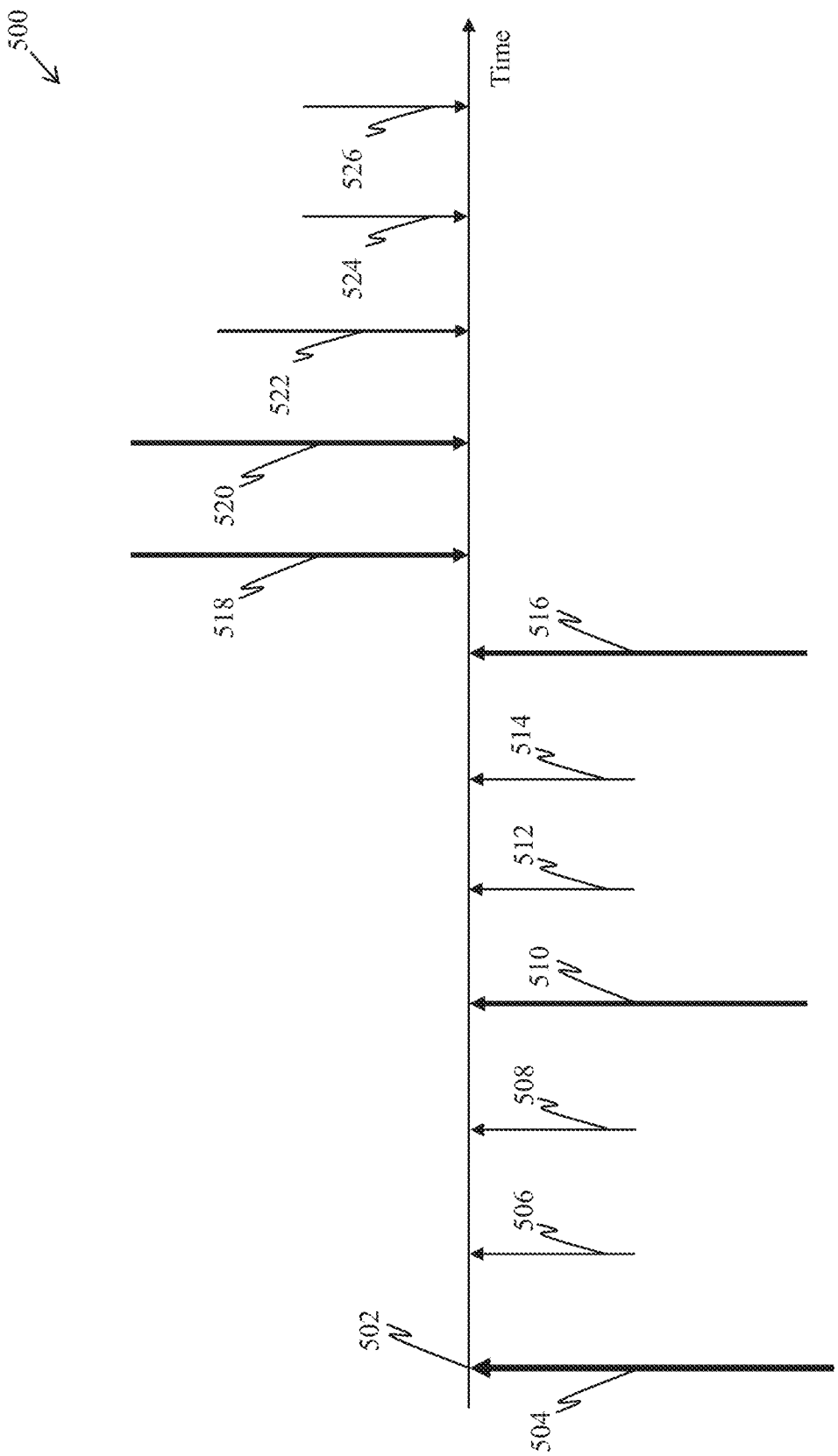
FIG. 5 is an exemplary timing diagram of a method for shared memory access by one or more clients, in accordance with an embodiment of the present disclosure.

FIG. 5 is an exemplary timing diagram of a method for shared memory access by one or more clients, in accordance with an embodiment of the present disclosure. FIG. 5 is described in conjunction with elements of FIGS. 1A and 1B. With reference to FIG. 5 there is shown an exemplary timing diagram 500 with a timeline 502 and a sequence of operations 504 to 526 executed along the timeline 502.

In the timelines 502, the operation 504 (at the leftmost) is executed first and then subsequent operations, such as the operations 506 to 526 with progress of time in the timeline 502. At operation 504, each of the one or more clients 106A-106N start journaling of its file operations. At operations 506 and 508, journaling of file operations prior to a snapshot (e.g., the snapshot 112) is carried out, but such file operations are ignored before a snapshot is generated at the operation 510. At operation 510, a snapshot is generated that captures the filesystem state of the shared memory. At operations 512 and 514, journaling of file operations executed by the one or more clients 106A-106N after the snapshot is generated, are considered and are to be replayed. At operation 516, backup as per the snapshot is executed that include source inode mapping to the target file system at the target NAS. At operation 518, restoration of snapshot 112 to target file system 104 is started while building a map between source and target inodes. At operation 520, the restore is complete. At operation 522, a last operation before snapshot 112 is determined. At operations 524 and 526, subsequent operations after the last operation are replayed in the target file system 104 to replicate the shared memory subsequently.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

The invention claimed is:

1. A memory controller, comprising:
   a control circuitry; and
   a network interface to be operatively connected to one or more clients for shared memory access, each client of the one or more clients comprising an IO clock, and
   a memory coupled to the control circuitry to store instructions, which when executed by the control circuitry, cause the memory controller to perform a recovery of a shared memory by:
      determining a starting point for the recovery; and then
      replicating the shared memory to a target file system based on the starting point,
   wherein the memory controller is to determine the starting point by:
      generating a journal of file operations in the shared memory;
      generating a snapshot of the shared memory;
      restoring the shared memory as per the snapshot to the target file system;
      determining last operation before the snapshot in the journal of file operations; and
      setting next operation after the last operation as the starting point, and wherein the memory controller is to
      replicate the shared memory by replaying the file operations according to the journal starting with the starting point; and
   wherein the memory controller is further to generate the journal of file operations by causing the one or more clients to journal the file operations, wherein the journal of file operations comprises a plurality of distributed journals of file operations.

2. The memory controller according to claim 1, wherein the memory controller is further to:
   determine the last operation by setting a counter to initial value;
   start with a file operation in the journal;
   determine a result of the file operation;
   determine if the result of the file operation is observable in the target file system;
   decrease the counter in response to the file operation is observable;
   increase the counter in response to the file operation is not observable;
   determine if the counter reaches the initial value;
   set the file operation as the last operation in response to the counter reaches the initial value; and
   proceed with the next file operation in response to the counter does not reach the initial value.

3. The memory controller according to claim 1, wherein the memory controller is further to
   determine an identifier for each file operation in the journal when generating the journal and store the identifier in a file operation identifier file until the snapshot is generated;
   select the file operation with a newest time stamp in the file operation identifier file;
   determine if a result of the selected file operation is observable in the target file system;
   set the selected file operation as the last operation in response to the selected file operation is observable; and
   set the selected file operation as the starting point in response to the file operation is not observable.

4. The memory controller according to claim 2, wherein a file operation is observable in response to there is no contradiction between the result of the file operation and a target volume, and a file operation is not observable in response to there is a contradiction between the result of the file operation and the target volume.

5. The memory controller according to claim 1 wherein the memory controller is further to
   build a map associating source and target identities with client identities; and
   replicate the shared memory by replaying the file operations according to the journal starting with the starting point based on the map.

6. The memory controller according to claim 2, wherein the memory controller is further to build a map by:
   to determining if the result of the file operation is observable,
   determine if the file operation is an inode operation; and
   record the result and sequence number of the file operation for all relevant nodes in the map in response to the file operation is the inode operation, or
   determine if the file operation is a data operation; and
   record the result and sequence number of the file operation for the relevant node in the map in response to the file operation is the data operation.

7. The memory controller according to claim 6, wherein the memory controller is further to determine if the file operation is observable by
   determining if the file operation is an inode operation, and use the map to find a target inode and check if an effect of the file operation is observable in that target inode in response to the file operation is the inode operation, or
   determining if the file operation is a data operation, and read relevant data in the target file system and compare it to data of the file operation in response to the file operation is the data operation.

8. The memory controller according to claim 1, wherein the journal comprises file operations indicating a file operation between a source and a target and a time stamp for the file operation.

9. The memory controller according to claim 8, wherein the journal further comprises inode details.

10. The memory controller according to claim 1, wherein the memory controller is further to backup the snapshot to the target file system.

11. The memory controller according to claim 1, wherein the snapshot includes inode mapping for sources in the file operations.

12. The memory controller according to claim 1, wherein each client comprises an IO clock and wherein the memory controller is further to
   synchronize IO clocks of the one or more clients before generating the journal.

13. The memory controller according to claim 12, wherein the memory controller is further to synchronize the IO clocks to a time equal to or less than a time taken for a file operation.

14. The memory controller according to claim 1, wherein the memory controller is arranged for Network-attached storage (NAS).

15. A method for a memory controller to be operatively connected to one or more clients for shared memory access, the method comprising:
   performing a recovery of a shared memory by
      determining a starting point for the recovery; and
      replicating the shared memory to a target file system based on the starting point, wherein the determining the starting point including:
    generating a journal of file operations in the shared memory;
    generating a snapshot of the shared memory;
    restoring the shared memory as per the snapshot to the target file system;
    determining a last operation before snapshot in the journal of the file operations; and
    setting next operation after the last operation as the starting point, and wherein the method comprises replicating the shared memory by replaying the file operations according to the journal starting with the starting point; and
    wherein the generating the journal of file operations comprises generating the journal of file operations by causing the one or more clients to journal the file operations, wherein the journal of file operations comprises a plurality of distributed journals of file operations.

16. The method according to claim 15, further comprising:
    determining the last operation by setting a counter to initial value;
    starting with a file operation in the journal;
    determining a result of the file operation;
    determining if the result of the file operation is observable in the target file system;
    decreasing the counter in response to the file operation is observable;
    increasing the counter in response to the file operation is not observable;
    determining if the counter reaches the initial value;
    setting the file operation as the last operation in response to the counter reaches the initial value; and
    proceeding with the next file operation in response to the counter does not reach the initial value.

17. The method according to claim 15, further comprising:
    determining an identifier for each file operation in the journal when generating the journal and storing the identifier in a file operation identifier file until the snapshot is generated;
    selecting the file operation with a newest time stamp in the file operation identifier file;
    determining if a result of the selected file operation is observable in the target file system;
    setting the selected file operation as the last operation in response to the selected file operation is observable; and
    setting the selected file operation as the starting point in response to the file operation is not observable.

18. The method according to claim 17, wherein a file operation is observable in response to there is no contradiction between the result of the file operation and the target volume, and a file operation is not observable in response to there is a contradiction between the result of the file operation and the target volume.

19. The method according to claim 15, further comprising:
    building a map associating source and target identities with client identities; and
    replicating the shared memory by replaying the file operations according to the journal starting with the starting point based on the map.

* * * * *